(12) United States Patent
Morriss et al.

(10) Patent No.: US 6,463,494 B1
(45) Date of Patent: Oct. 8, 2002

(54) METHOD AND SYSTEM FOR IMPLEMENTING CONTROL SIGNALS ON A LOW PIN COUNT BUS

(75) Inventors: Jeff Morriss, Cornelius, OR (US); Pranav Mehta, Chandler, AZ (US); Narayanan Iyer, Davis, CA (US); Robert Greiner, Beaverton, OR (US); Peter J. Ruscito, Folsom, CA (US); Shreekant Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,302

(22) Filed: Dec. 30, 1998

(51) Int. Cl.[7] ............................................... G06F 13/14
(52) U.S. Cl. ...................................... 710/305; 710/110
(58) Field of Search .................................. 710/126, 129, 710/116, 112, 113, 305, 306, 309, 105, 110, 118, 124, 125; 709/208, 222, 200, (56) References Cited

U.S. PATENT DOCUMENTS

| | | | | |
|---|---|---|---|---|
| 4,779,093 A | * | 10/1988 | Watkins | 340/825.57 |
| 5,257,356 A | | 10/1993 | Brockmann et al. | 710/129 |
| 5,459,840 A | | 10/1995 | Isfeld et al. | 710/129 |
| 5,467,295 A | | 11/1995 | Young et al. | 709/222 |
| 5,535,333 A | | 7/1996 | Allen, Jr. et al. | 709/200 |
| 5,867,670 A | * | 2/1999 | Kim et al. | 710/113 |
| 5,915,105 A | * | 6/1999 | Farmwald et al. | 365/233 |
| 6,032,178 A | * | 2/2000 | Bacigalupo et al. | 709/208 |
| 6,038,195 A | * | 3/2000 | Farmwald et al. | 365/233 |
| 6,088,751 A | * | 7/2000 | Jaramillo | 710/116 |

\* cited by examiner

Primary Examiner—Peter Wong
Assistant Examiner—X. Chung-Trans
(74) Attorney, Agent, or Firm—Kenyon & Kenyon (57) ABSTRACT

A method and system are disclosed allowing devices to communicate using a highly efficient low pin count bus comprising a set of data lines, a strobe line, and one control line. Command information is transmitted simultaneously with data, the command information being defined by its timing.

11 Claims, 10 Drawing Sheets

WRITE STATE

FIG. 1

WRITE STATE
FIG. 2

FIG. 3
WRITE STATE

FIG. 4
WRITE STATE

FIG. 5
READ STATE

FIG. 7

INACTIVE STATE, LISTEN STATE AND TRANSFER OPERATION

FIG. 9

LISTEN STATE AND TRANSFER OPERATION

FIG. 10

METHOD AND SYSTEM FOR IMPLEMENTING CONTROL SIGNALS ON A LOW PIN COUNT BUS

BACKGROUND OF THE INVENTION

I. Field of the Invention

This invention relates generally to communication between two computer processors. More particularly, the present invention relates to an apparatus and method for multidirectional communication between processing devices, in which data is transmitted via a low pin count bus.

II. Background Information

Modern computers may often utilize more than one processor. In addition, a main processor may be used in combination with a number of coprocessors. Coprocessors perform numerous tasks which a processor may perform but which are more efficiently performed by a dedicated device designed for a particular task. Tasks coprocessors perform may include math functions, image or graphics processing functions, audio functions, encryption, and password or identification verification. Often the multiple processors and coprocessors in a computer system are not fabricated on the same chip or located in the same package. However, such devices must communicate with each other, transferring data between them. Furthermore, other devices in a computer system, such as memory devices or I/O devices must communicate with each other and with processors and coprocessors. When used herein, data may include operands, instructions, commands, or any other information, such as text, images, etc.

Typically, devices in a computer system communicate using busses. A bus is a set of one or more lines connecting two or more devices and allowing them to communicate data. Typically, a bus has a protocol which each device connected to the bus must obey. A protocol controls the timing and sequence of data and control signals on a bus. A protocol allows for flow control—identifying the source and recipient of data sent on the bus, identifying the data itself, and indicating that devices are ready or not ready to send and receive data. Often one device at a time is allowed to transmit data on the bus. Furthermore, often one device at a time is permitted to control the bus, determine which devices transmit data, and determine which data is transmitted; this device is often termed the "master" device. A protocol also allows for arbitration to determine which device is the master device, particularly when more than one device wishes to transmit data on the bus. A protocol may also provide error detection and correction, and other functions.

To minimize the cost of the bus, the bus needs to be narrow—i.e., to have a low pin count or number of wires. However, it is also desirable to have a bus with a high bandwidth or throughput. Furthermore, it is desirable for a bus to have a high bus efficiency, the ratio of the number of clocks of data sent to the number of clocks required to send the data. These requirements of low pin count on the one hand and high bandwidth and bus efficiency on the other are at odds with each other; known systems having low pin count have low bandwidth and low bus efficiency, and known systems having high bandwidth and high bus efficiency have high pin count. Lowering the pin count on a bus may cause latency overhead, i.e., transmission delays. Reducing the number of lines on a bus may require that data transmission and flow control or arbitration take place on the same line or lines; thus data transmission and flow control or arbitration cannot take place simultaneously, delaying both data transmission and control signals. Such systems may have high buffering overhead, because the lack of flow control during data packet transmission requires receiving devices to maintain large buffers.

Often two devices communicating using a bus may wish to transmit flow control (i.e., not ready to receive) or arbitration (i.e., a bus ownership request) information to each other simultaneously; this may not be possible if the number of control lines for the bus is reduced to one. Typically, more than one device cannot transmit information on the same bus line at the same time. With wider busses, multiple lines are used to allow bus arbitration and flow control to take place during data transmission—for instance, dedicated bus request and grant lines are used.

Therefore it is desirable to have a bus that is narrow and at the same time has a high bandwidth and high efficiency. It is desirable to have a bus capable of transmitting data and flow control, arbitration and other control signals at the same time. It is desirable to have flow control, arbitration and other control signals take place on a minimum number of lines without incurring the delays associated with such systems.

SUMMARY OF THE INVENTION

A method and system are disclosed allowing devices to communicate using a highly efficient low pin count bus comprising a set of data lines, a strobe line, and one control line. Command information is transmitted simultaneously with data, the command information being defined by its timing.

DETAILED DESCRIPTION

I. Overview

In an exemplary embodiment, the system and method of the present invention allow two devices to communicate and transfer data using a narrow bus (i.e., a bus with a small number of lines) without having to incur the buffering and latency overhead typical of a pure packet transmission scheme. With an extremely narrow bus, arbitration, flow control and command and data transmission take place over a small number of lines—possibly one line. Thus bus arbitration and flow control take time and delay the sending of actual data. In addition, these systems cannot preform flow control during packet transmission; thus these systems require the receiving device to maintain a large buffer. Arbitration procedures and other control signals may not be transmitted simultaneously with data.

With wider busses, multiple lines are required to allow bus arbitration and flow control to take place during data transmission—for instance, dedicated request lines and grant lines are used.

An exemplary embodiment of the present invention allows for control signals comprising flow control and bus arbitration signals to be sent on a minimum number of lines, simultaneously with data transmission. Data may be transmitted without the delays incurred when waiting for a device to indicate it is ready to receive. Other embodiments of the present invention may involve other sets of control signals being sent on a minimum number of lines, for instance, error signals.

In an exemplary embodiment, the system and method of the present invention allow for control information such as flow control and bus arbitration to take place on one line of a narrow bus while data is being transmitted on other lines of the bus. A slave device (i.e., a device which is not in control of the bus) may initiate bus arbitration procedures while a master device (the device which has control of the bus) is transferring data. Bus arbitration and flow control may take place using only one line. The bus uses only one control line, rather than the multiple control lines existing on wider busses. The devices using the bus share usage of the control line during pre-determined time slots, thus control line use is efficient. Arbitration and data flow control are both time and bus line efficient. A high bus efficiency is achieved—with the smallest data packet the bus is ⅔ efficient and larger packets approach 100% efficiency.

The system and method of an embodiment of the present invention achieve these benefits by allowing the meaning of control signals (i.e., their significance or information content) to be defined by the system or bus state and time slot in which they occur and by the length of the signals. Different bus states, such as those defining read and write operations, have time slots where either the master device or a slave device may transmit bus arbitration or flow control signals. Thus only one control line needs to be used to transmit a broad range of information in parallel with data transmission, reducing the number of lines required for the bus and increasing bus efficiency and throughput.

In an exemplary embodiment of the present invention the control signals transmitted on the control line (and at times on other lines) include bus arbitration and flow control information, and may include other information. The meaning of the control information is defined by the timing of the control signal. The timing may include the clock period and system state in which the signal starts, the signal's duration, or other aspects of the signal. In an exemplary embodiment, the timing of the control information comprises the state of the bus, the start time of the control signal, and the length of the signal. Other embodiments may define the timing of the control signal in other ways, for example in a way not related to a clock period. In an exemplary embodiment of the present invention the state of the bus is a mode of operation of the bus where certain signals—data, command, control, etc.—are expected on certain lines at certain times. However, in other embodiments the state of the bus may be defined by other qualities, for example, a time period separate from the clock signal.

II. Bus Structure And States

The bus according to an exemplary embodiment of the present invention allows a host processor and a coprocessor to communicate; at all times, one device is termed the master device and one device is termed the slave device. Alternate embodiments may allow for communication between other types of devices, and among more than two devices. When used herein, "master", "master device" or similar terms indicate the device which has current control of the bus, and "slave", "slave device" or similar terms indicate any of a number of devices which do not have current control of the bus. The bus consists of four bi-directional data, address and command lines ("data/address" lines), a bi-directional control line, a bi-directional data strobe, and a uni-directional clock line. During read and write operations flow control and bus arbitration take place on the one control line without interfering with data transmission, which may occur simultaneously. This keeps the line count on the bus low and increases throughput and bus efficiency. When data transmission does not occur the bus may enter a listen state, in which the control line and one of the data lines handle bus arbitration. This allows bus arbitration to occur with only one dedicated control line.

Figure 10:
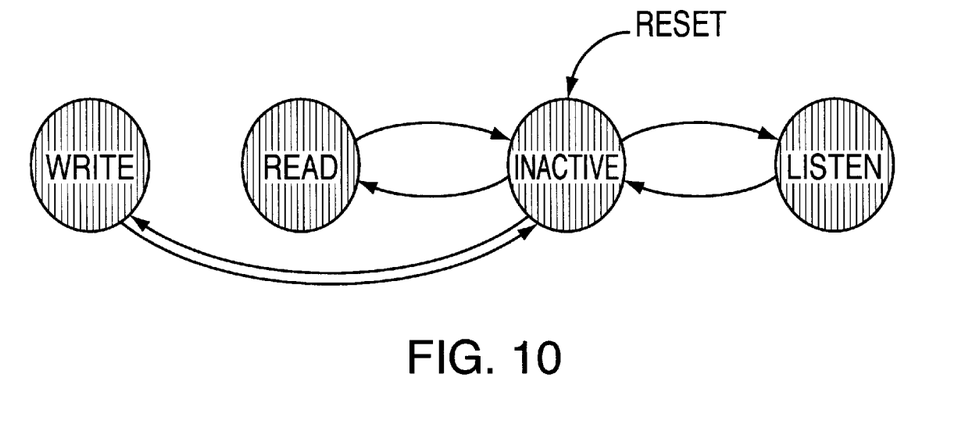
FIG. 10 is a chart illustrating the relationship between the states of a bus according to an embodiment of the present invention.

The bus uses four bus states to allow for time-efficient bus arbitration using only one control line: a write state, a read state, a listen state, and an inactive state. FIG. 10 is a chart illustrating the relationship between the states of a bus according to an embodiment of the present invention. On reset the bus enters the inactive state. To transfer data the bus is transferred to the read or write state. During the read and write states the master device receives or sends data, respectively. The slave device may request control of the bus during the read or write state by sending a signal on the control line at a certain time. During the listen state the master has control of the bus but may not initiate a data transfer. During the listen state the master may signal that it intends to leave the listen state (and thereafter initiate a data transfer) by signaling on the control line, and the slave device may request control of the bus (in order to initiate a data transfer) by signaling on one of the address/data lines.

The inactive state may occur after a read, write or listen state. On or after the transition to the inactive state the master device may initiate a read, write or listen state. The master device may transition from a write state immediately into another write state or a read state without keeping the bus in the inactive state. The master device may only grant a bus control request of a slave device during the inactive state; however, a command by the master device may transition the bus from the listen state to the inactive state and grant a bus request at the same time. After a system reset or start-up, one pre-determined processor is the master device and the system is in the inactive state.

The master device requests data from the slave device during a read state and transfers data to the slave device during a write state. After a read or write state ends the bus may enter the inactive state, at which point the master may place the bus in a listen state or enter a read or write state.

During the listen state no data is transferred and the master device owns the bus. The master device may exit the listen state to initiate a data transmission (the exit and transfer initiation may happen simultaneously), and the slave device may request ownership of the bus (and thus master status).

In an exemplary embodiment, the bus is source synchronized in that the device sending the data also sends a strobe signal on a strobe line. The strobe signal is used to clock the data transmission on the data/address lines, which occurs on both the rising and falling edges of the strobe line. The unidirectional clock line is used to synchronize the two devices. The strobe signal is derived from the clock line signal.

Alternate embodiments of the present invention may use numbers of lines and types of lines in addition to those discussed herein. For instance more or less data lines may be used, and different methods may be used to send clock and synchronization information. Additional lines may be added to the bus to send additional types of information.

It should be noted that the system and method of the present invention may be used with busses servicing more than two devices. For example, other embodiments may allow one device to be considered the master device during any period of time, with the remaining devices attached to the bus being considered slave devices. The devices using the bus transfer data which may include command information, data, or other information. The devices may be located on different packages on the system or may be located on the same package.

The present invention encompasses systems and methods using device status definitions other than "master" status and "slave" status.

The method and system of the present invention does not require four bus states to be used, or for any bus states to be defined. The system and method of the present invention, using time information to send a broad range of control signals over one data line, may use methods other than bus states to define the control signals.

Figure 1:
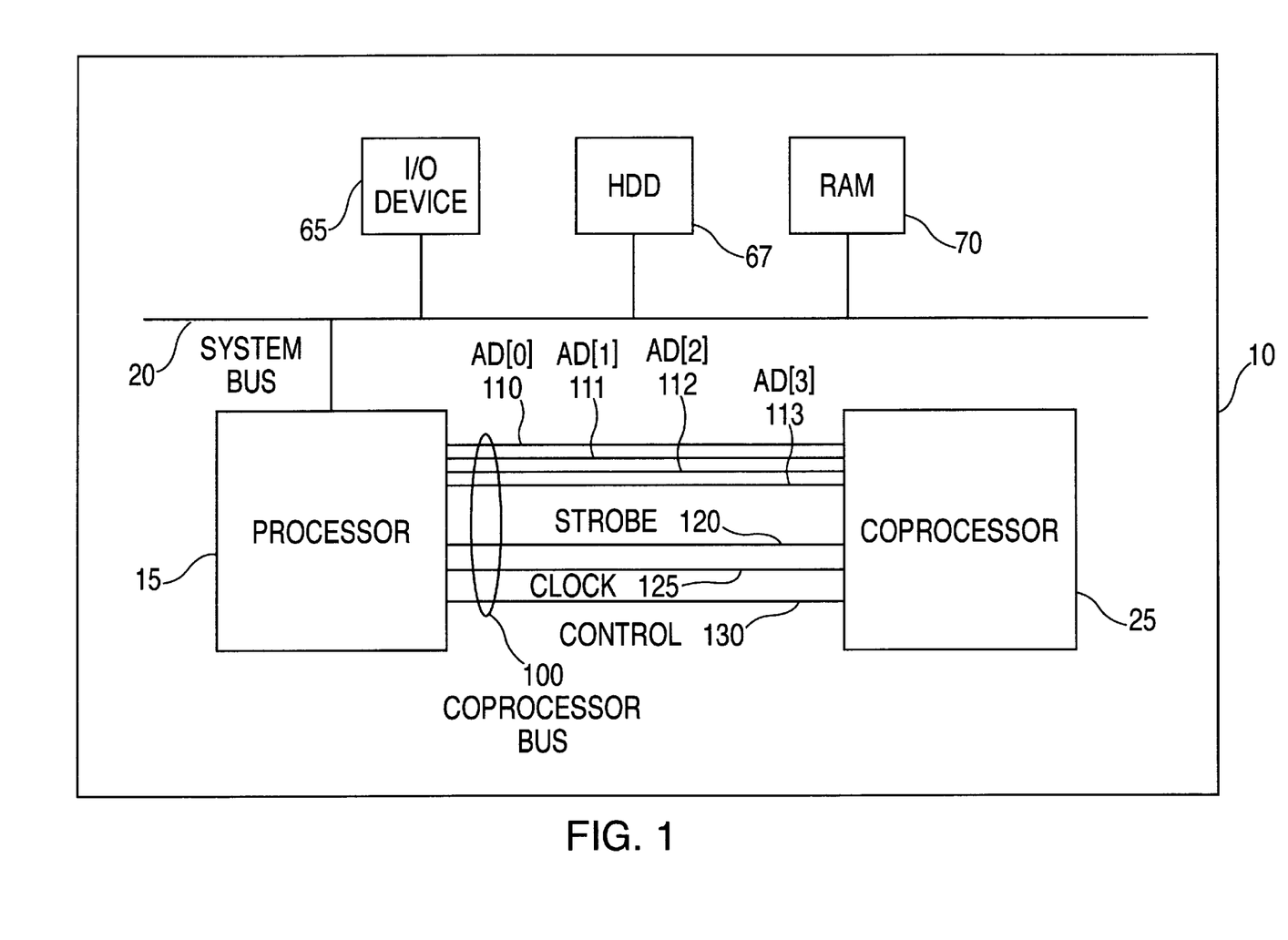
FIG. 1 is a block diagram illustrating a computer system according to an embodiment of the present invention.

Referring to the figures in which like numerals indicate like elements, FIG. 1 is a block diagram illustrating a computer system 10 according to an embodiment of the present invention. Computer system 10 includes processor 15, which executes instructions and controls the operation of computer system 10. Processor 15 may be, for example, a Pentium II™ processor available from Intel™ Corp. Computer system 10 includes coprocessor 25, for providing additional instruction processing capability. Computer system 10 includes system bus 20, which allows the various components of computer system 10 to communicate, and may alternatively include a plurality of busses or a combination of busses and bus bridge circuits. System bus 20 is coupled to processor 15, at least one I/O device 65, for transferring data to and/or from computer system 10, hard disk drive 67, for storing information, and random access memory ("RAM") 70, for temporary storage of information. Computer system 10 includes coprocessor bus 100, which allows processor 15 and coprocessor 25 to exchange data.

Coprocessor bus 100 is a narrow bus, utilizing relatively few lines, yet allowing for efficient bus arbitration and data flow control which may be performed during data transmission and with only one control line. Arbitration and data flow control are both time and bus line efficient, and a high bus efficiency is achieved.

In an exemplary embodiment coprocessor bus 100 comprises four data/address lines[0–3] 110–113, for transmitting commands, address information, data, and bus arbitration information, strobe line 120, for synchronizing the sending and receipt of data, clock line 125, for providing a reference clock to coprocessor 25, and control line 130, for transmitting flow control information and bus arbitration information. Clock line 125 is unidirectional, and allows processor 15 to provide a clock signal to coprocessor 25. All other lines in coprocessor bus 100 are bi-directional. All lines on coprocessor bus 100 are held high (i.e., 1) when inactive. Signals on control line 130 are given meaning based on the state in which they occur, the time period in which they occur, and the length of their assertion. This allows the one control line to transmit a broad range of information in parallel with data transmission.

In an exemplary embodiment of the present invention coprocessor bus 100 operates during a series of clock periods defined by the signal carried by clock line 125. The clock signal provided on clock line 125 is the front side bus clock signal or an integer multiple or quotient of the front side bus signal. The signal on clock line 125 is used by coprocessor 25 as a reference clock to clock its internal signals, and to synchronize the communication of processor 15 and coprocessor 25. The signal on strobe line 120 has the same frequency as the signal on clock line 125, and may have a different phase than that signal. A bit may be sent on address/data lines 110–113 during both the rising edge and the falling edge of the strobe signal. Thus for each address/data line 110–113 two bits may be transmitted during each clock period of the signal on clock line 125, increasing bus throughput and efficiency.

During data transfer, signals sent on control line 130 are coordinated with the signal on clock line 125, thus one bit is sent on control line 130 per clock period on clock line 125. Due to bus latency and setup and hold time requirements, signals asserted on control line 130 may not be recognized or responded to for two clock periods. Setup and hold times on control line 130 must meet common clock timing. When coprocessor bus 100 is not transferring data, control line 130 may not be coordinated with the signal on clock line 125. Other embodiments may use other synchronization methods.

At all times one of devices 15 and 25 has control over coprocessor bus 100 and is termed the master device and the other of devices 15 and 25 is termed the slave device. This status changes according to bus arbitration procedures. The slave device may request control of coprocessor bus 100 during certain times.

Master or slave status of devices is not permanent; under the system and method of an embodiment of the present invention during specified times the master device and slave device communicate with each other to determine if the master and slave status should be changed, thus changing which device has control of coprocessor bus 100. While the figures refer to devices 15 and 25 communicating using coprocessor bus 100, either device may have master status (indicating the other device has slave device status), and the status may change according to arbitration procedures. After a system reset or start-up, processor 15 is the master device, coprocessor 25 is a slave device, and the system is in the inactive state.

A packet transferred on coprocessor bus 100 consists of a command field and a data field. In an exemplary embodiment of the present invention, the command field lasts either four or eight clock periods. Two bits are transmitted on each of four address/data lines 110–113 during each clock period;

thus a command field of four clock periods contains four eight bit bytes (32 bits) and a command field of eight clock periods contains eight bytes. The master device indicates the beginning of the command field by holding control line 130 low (i.e., 0), and indicates the end of the command field by holding control line 130 high. Furthermore, the length of the command field may be determined by command itself. The specific data packet protocol described, having a defined command section and a defined data section, need not be used. Other embodiments may use other methods to transmit command and address information.

The command field comprises a read/write bit, for indicating if the transfer is a read or a write, a two bit transfer type field, for indicating the type of transfer, a register/memory bit, for indicating if the transfer is to or from a register or a memory unit, address bits, for indicating which memory cell or register from which or to which to transfer, reserved bits, which have no function, and one parity bit for each address/data line 110–113, for detecting data transmission errors. Parity for the sequence of command bits sent on each address/data line 110–113 is generated over all the command bits sent on that line for a command field, and parity is generated such that the number of ones, including the parity bit, for each address/data line 110–113 for a command field is odd. The transfer type may indicate, for example, if the transfer is to or from a cache, if the transfer is a read or a write, if the transfer is of fixed length or variable length, and the granularity of the data sections.

The data field is transmitted in one or more data sections lasting eight or 64 clock periods. The length of the data sections of a data field (the "granularity" of the data field) is determined by the command field. Each data section of eight clock periods contains eight bytes of data, two bytes for each clock period over four address/data lines 110–113; each 64 clock period data section contains 64 bytes. A variable number of data sections may be transferred. To indicate the last data section during a transfer operation, control line 130 is asserted by the device master device, which sends the data, during a certain time during the transfer of that data section. The data field is protected by a 16 bit cyclic redundancy check ("CRC") which can detect all one and two bit errors on a data field of up to 8 K bytes in length and which detects most burst errors, errors of multiple bits. The CRC is transmitted after the last data packet, over two clock periods. Other error detection methods may be used.

The strobe signal is driven by the data sender; during a write state the master device drives (i.e., causes signals to appear on) the strobe and during a read the slave device drives the strobe.

III. Write State

In an exemplary embodiment of the present invention, the master device transfers data to the slave device during a write state. A write state is indicated by the read/write bit of the command field being low (not shown).

The master device drives strobe line 120 and address/data lines 110–113 during the write state. The master device drives control line 130 during the command portion of the write state. During the write state the master uses control line 130 to indicate the beginning and the end of the command field, to indicate that the master is ready or not ready to transmit data and to indicate the end of the sequence of data sections. During the write state the slave device uses control line 130 to indicate it is ready or not ready to receive data and to request control of coprocessor bus 100.

Allowing one control line to transmit data flow and bus arbitration signals in parallel with data transmission allows for a narrow yet efficient bus. One control line may be used, as control information signals are defined by the state and time period in which they occur and by the time length of their transmission. Furthermore, the double pumping of data (i.e., sending two bits of data during each clock period) improves transmission efficiency.

While specific signals are described for each of the four states, other signal definitions, based on other timing criteria, may be used without departing from the scope of the method and system of the present invention. Other embodiments may encompass signals having meanings other than those defined herein; for instance, the control line may transmit a signal indicating that an error was detected during transmission. Other timing, state, and length criteria may be used to define the signals described herein or other signals. For instance, the signals described may occur in other clock periods and have lengths other than those described herein.

In an exemplary embodiment of the present invention the command field may be either four or eight clock periods in length and the data sections of the data field may be eight or 64 clock periods in length. The figures depict command fields of four clock periods in length and data sections of eight clock periods in length. However the description that follows describes command fields of four and eight clock periods in length and data sections of eight and 64 clock periods in length. Other embodiments may use other lengths and formats for command and data fields.

The bus transitions from the inactive state to the write state on the initiation of a write by the master device (FIG. 10). On the termination of the write state the bus returns to the inactive state.

Figure 2:
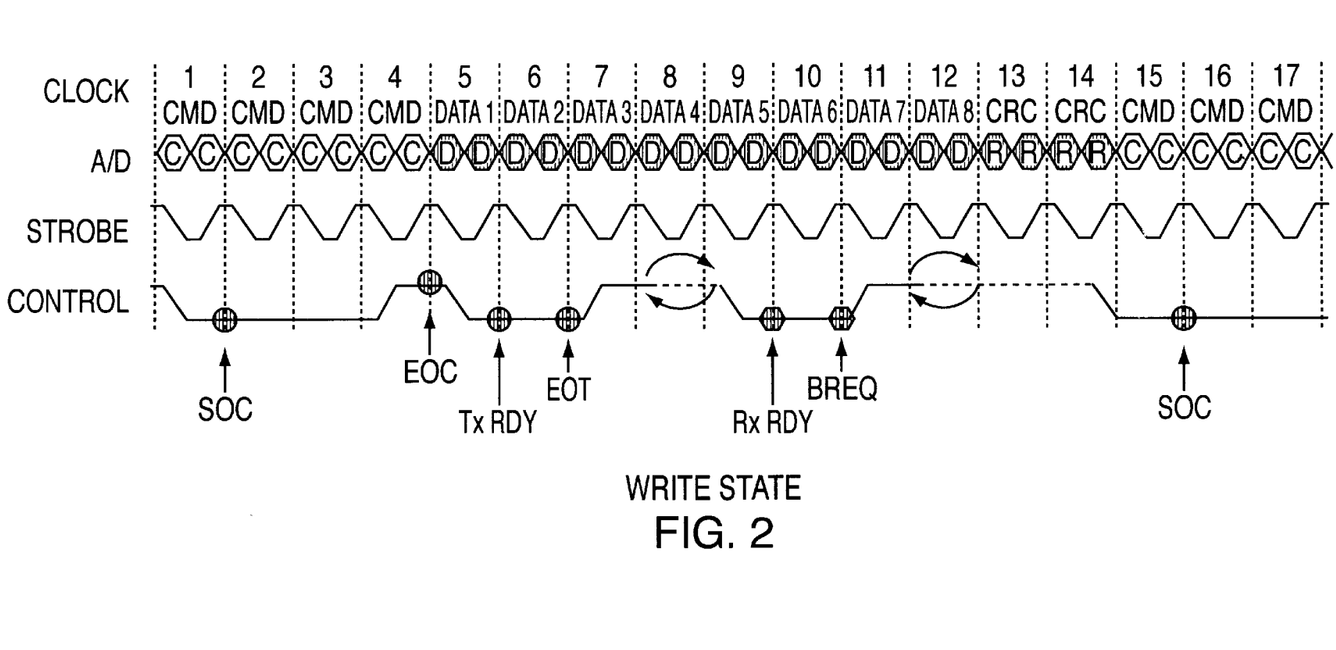
FIG. 2 is a chart illustrating a sequence of signals during a write state on the coprocessor bus of FIG. 1 according to an embodiment of the present invention.

FIG. 2 is a chart illustrating a sequence of signals during a write state on coprocessor bus 100 of FIG. 1 according to an embodiment of the present invention. During the first four clock periods command data is sent on address/data lines 110–113, two bits of command data per clock period on each line. Data information is sent on address/data lines 110–113 from clock periods five through 12, two bits per clock period per line. CRC is sent during clock periods 13 and 14. Arrows and dotted lines in clock periods eight and 12 indicate control line 130 is being turned around, i.e., control of the line is being switched from one device to the other.

During the first four clock periods of the write state depicted in FIG. 2, the master device uses address/data lines 110–113 to send the command field. The master device indicates the beginning of the command field by holding control line 130 low (clock period 1, indicated by "Start Of Command", or "SOC"), and indicates the end of the command field by holding control line 130 high (clock period 4, indicated by "End Of Command", or "EOC"). Furthermore, the command itself indicates the length of the command field and the granularity of the data sections.

The master device sends one or more data sections after the command field. The master device may send multiple data sections; the last data section is signified by a control line signal driven by the master during a certain period of that data section. Two bits are written on each address/data line 110–113 during each clock period, and the data sections of the data field have a granularity of eight or 64 clock periods.

During the first clock period of a data section the master device indicates it is ready to send data ("TxRDY") by holding control line 130 low.

Figure 3:
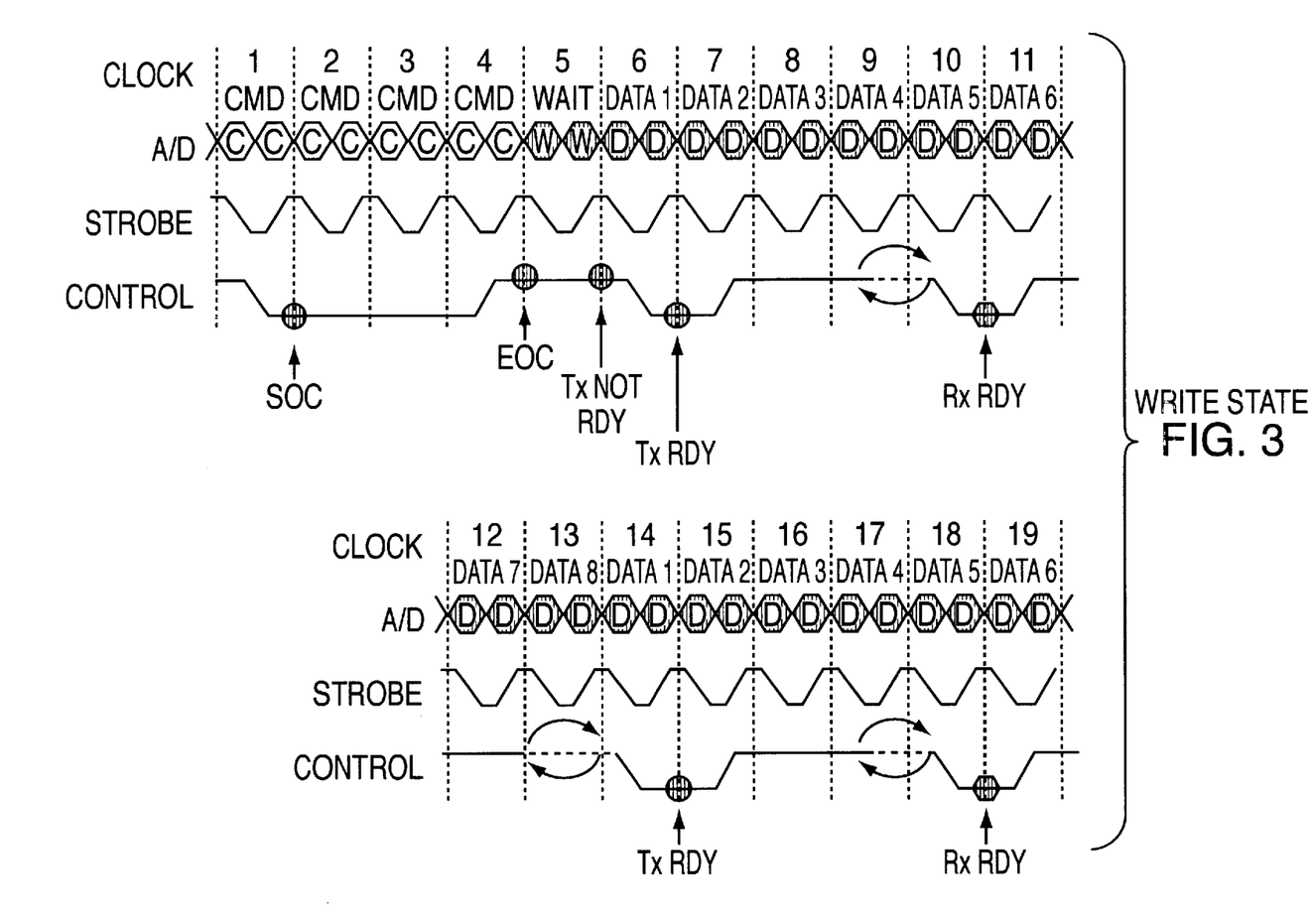
FIG. 3 is a chart illustrating a sequence of signals during a write state on the coprocessor bus of FIG. 1 according to an embodiment of the present invention.

FIG. 3 is a chart illustrating a sequence of signals during a write state on coprocessor bus 100 of FIG. 1 according to an embodiment of the present invention.

If the master device is not ready to send data it delays sending the data, inserts wait states (where no data is sent) on address/data lines 110–113 (clock period five), and holds control line 130 high ("Tx not RDY", clock period five), until it is ready to send. The slave device buffers all input on address/data lines 110–113 but does not start to accept the portion of the buffered data asserted on or after the time TXRY is asserted as input until it reads the TXRY signal (sent in clock period six). This signal may be recognized after the data with which it matches has been buffered; thus the slave device may recognize data buffered on previous clock periods in response to a TXRY signal.

During the second clock period of a data section the master device indicates whether or not the current data section is the last data section to be written. When the master device is sending the last data section, it indicates that this is the last data section by holding control line 130 low during the second clock period of the data section. This indicates an End Of Transmission ("EOT"), occurring during clock period six (the second data section clock period) in FIG. 2. If, during the transmission of a data section, the master device intends to send a subsequent data section, the master device holds control line 130 high during the second data section clock period.

By sending the EOT on control line 130 in parallel with data transmission an embodiment of the system and method of the present invention allows a shorter command section to be sent. Other embodiments may use other methods to define all the signals described herein, including the EOT. For instance, the EOT may occur during a different clock period or may be indicated by a length of the data portion in the command section. The pipelined flow control of an embodiment of the present invention, where, for example ready or not ready signals are sent in parallel with data, is advantageous, as unused cycles are not added between data sections if the receiver and sender can complete the transfer without wait states. Other embodiments may use other methods of flow control; for instance it is not necessary that the flow control signals be included on the control line. As with other signals described, other embodiments may define the flow control signals with different timing requirements.

Three clock periods after TxRDY is sent, control line 130 is turned around, and for several clock periods control line 130 is driven by the slave device. Turnaround is indicated by arrows and dotted lines in clock period eight, FIG. 2 (data clock period four).

During clock period five of each data section the slave device indicates it is ready or not ready to receive the subsequent data field or the ending CRC section. Receiver ready ("RxRDY") is indicated by holding control line 130 low for one clock period. This is shown in FIG. 2 in clock period nine, data section clock period five.

Figure 4:
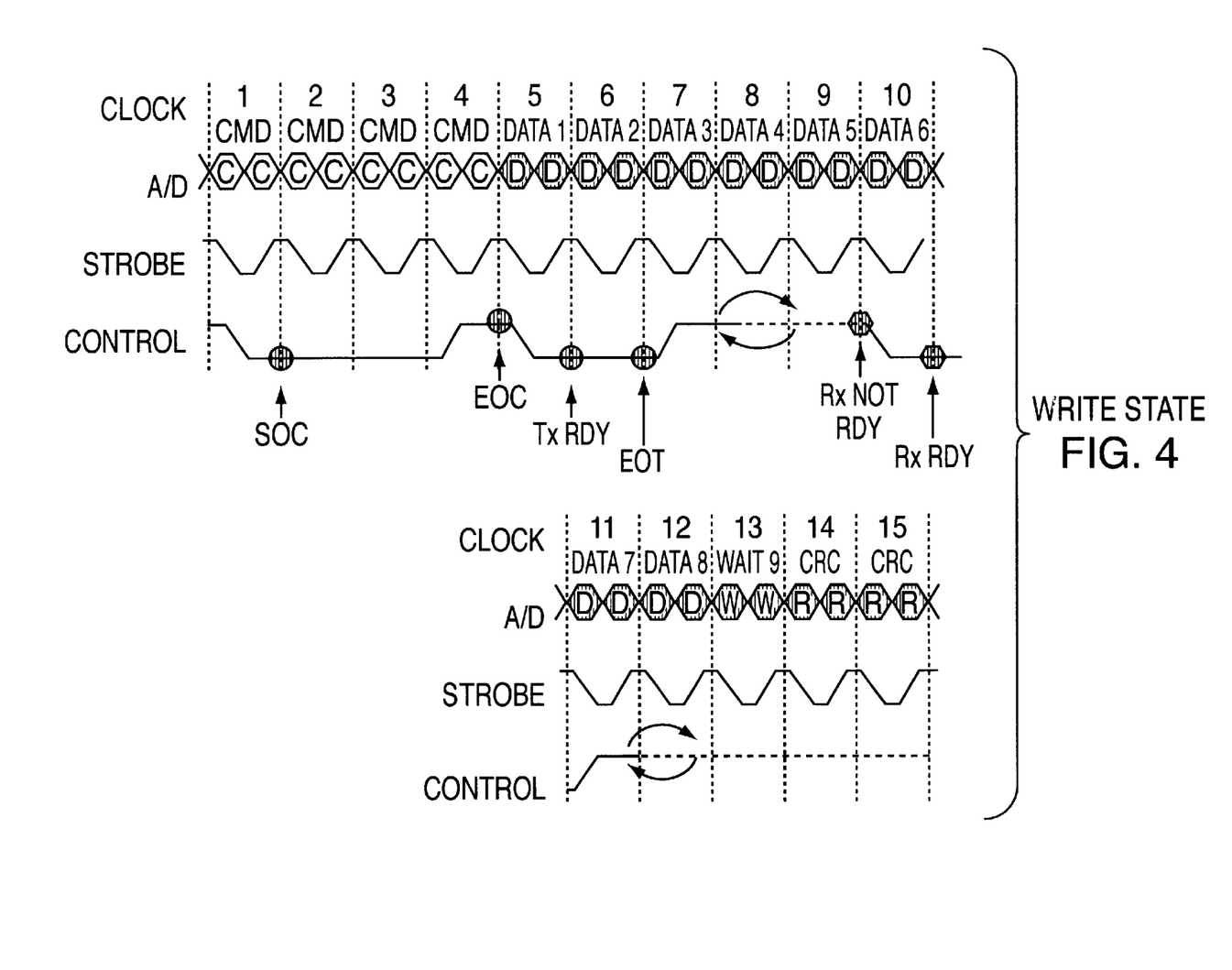
FIG. 4 is a chart illustrating a sequence of signals during a write state on the coprocessor bus of FIG. 1 according to an embodiment of the present invention.

FIG. 4 is a chart illustrating a sequence of signals during a write state on coprocessor bus 100 of FIG. 1 according to an embodiment of the present invention.

The slave device indicates it is not ready to receive ("Rx not RDY") by holding control line 130 high during data section clock period five. This is indicated by the Rx not RDY in clock period nine (data section clock period five) in FIG. 4. If the slave device indicates it is not ready to receive data the master device stops sending data after the transmission of the current data section. However, the slave device must receive and buffer the current data field, being sent as the slave device asserts Rx not RDY. Transmission of the current data section is completed, and the current data section is not resent. Note that the transmission of a data section, and thus the starting clock period of a data section, may be delayed by a Tx not RDY.

By sending the current data section while the receiving device indicates whether it is ready to receive the next data section the system and method of an embodiment of the present invention eliminates the latency that would be produced if the sending device was forced to wait for receiver ready confirmation. Other embodiments may use different data buffering methods.

For each clock period that the slave device holds control line 130 high to indicate it is not ready to receive data, the master device inserts two wait states on address/data lines 110–113 after the current data section is sent. These wait states occur in clock period 13 of FIG. 4. Two wait states are inserted for each clock period as two data bits are sent for each clock period. One control line signal is sent per clock period, while two data or command signals are sent for each clock period.

If the slave device indicates it is not ready to receive data, as in clock period 9 of FIG. 4, it drives control line 130 high until it is ready to receive data. When the slave device is ready to receive, it asserts RxRDY by driving control line 130 low for one clock period, in response to which the master device continues sending data (or the CRC section, if the current data section is the last data section). This is shown in clock period 10 of FIG. 4. The master device continues data (or CRC) transmission no less than four clock periods from the sending by the slave device of RxRDY.

For the slave device to request control of coprocessor bus 100 ("BREQ") during a write, the slave device holds control line 130 low during one additional clock period after asserting RxRDY. In FIG. 2 this occurs during clock period ten, data section clock period six; however, if wait states have occurred due to the slave device not transmitting RxRDY for any period of time the transmission of BREQ is also delayed. During a write state, the slave device may only issue a BREQ immediately after issuing an RxRDY. The slave device may issue a BREQ during any data section of a write operation. However, the entire write sequence, which may consist of multiple data sections, is completed before the master device responds to the BREQ. The master device grants a bus request (or ignores the BREQ) after the current write state has been completed, during the inactive state, described below. The master device may transition coprocessor bus 100 from the listen state to the inactive state and grant a bus request at the same time. The slave device pulls control line 130 high immediately after asserting RxRDY if it does not make a BREQ.

During the eighth clock period of each data section, control line 130 is turned around and the master device drives the control line (FIG. 3, clock period 13). Transmission of the eight or 64 clock length data section completes. If further data sections are to be sent, the sequence of control line signals for a data section repeats as discussed above, starting with the master device indicating ready/not ready to send data in data section clock period one. This is shown in FIG. 3, clock periods 14–19.

If the current data section is the last data section, a 16 bit error checking CRC is sent over two clock periods; this is indicated in clock periods 13 and 14 in FIG. 2.

After the write state, coprocessor bus 100 may enter the inactive state, described below (See FIG. 10). However, after a write state the master device may immediately transition the bus from the inactive state to another write state or a read state. This is indicated by the master device holding control line 130 low for more than two clock periods, signifying a command section (FIG. 2, starting with clock period 15). The two cycle bus turnaround period (described below), which occurs at the end of a read state, is not required after a write state, as the master device is in control of coprocessor bus 100.

A bus grant, where the master device grants a request by a slave device for control of coprocessor bus 100, occurs during the inactive state. A bus grant is signified by the master device holding control line 130 low for exactly two clock periods. At the end of a read or write state the master device must wait one clock period before issuing a bus grant; however, during the inactive state the master may exit the inactive state and issue a bus grant simultaneously.

IV. Read State

In an exemplary embodiment of the present invention, the slave device transfers data to the master device during a read state under the direction of the master device. A read state is indicated by the read/write bit of the command field being high (not shown). The master device drives control line 130 and address/data lines 110–113 during the command portion of the read state. The slave device drives strobe line 120 and address/data lines 110–113 during the data portion of the read state.

During the read state the slave device uses control line 130 to indicate that it is ready or not ready to transmit data and to request bus control. During the read state the master device uses control line 130 to indicate the beginning and the end of the command field, to indicate it is ready or not ready to receive data, and to indicate the end of the transmission. In this manner one control line may be used to control data flow and to arbitrate control of coprocessor bus 100 without causing data transmission delays or inefficiencies.

The bus transitions from the inactive state to the read state on the initiation of a read by the master device (FIG. 10). On the termination of the read state the bus returns to the inactive state.

Figure 5:
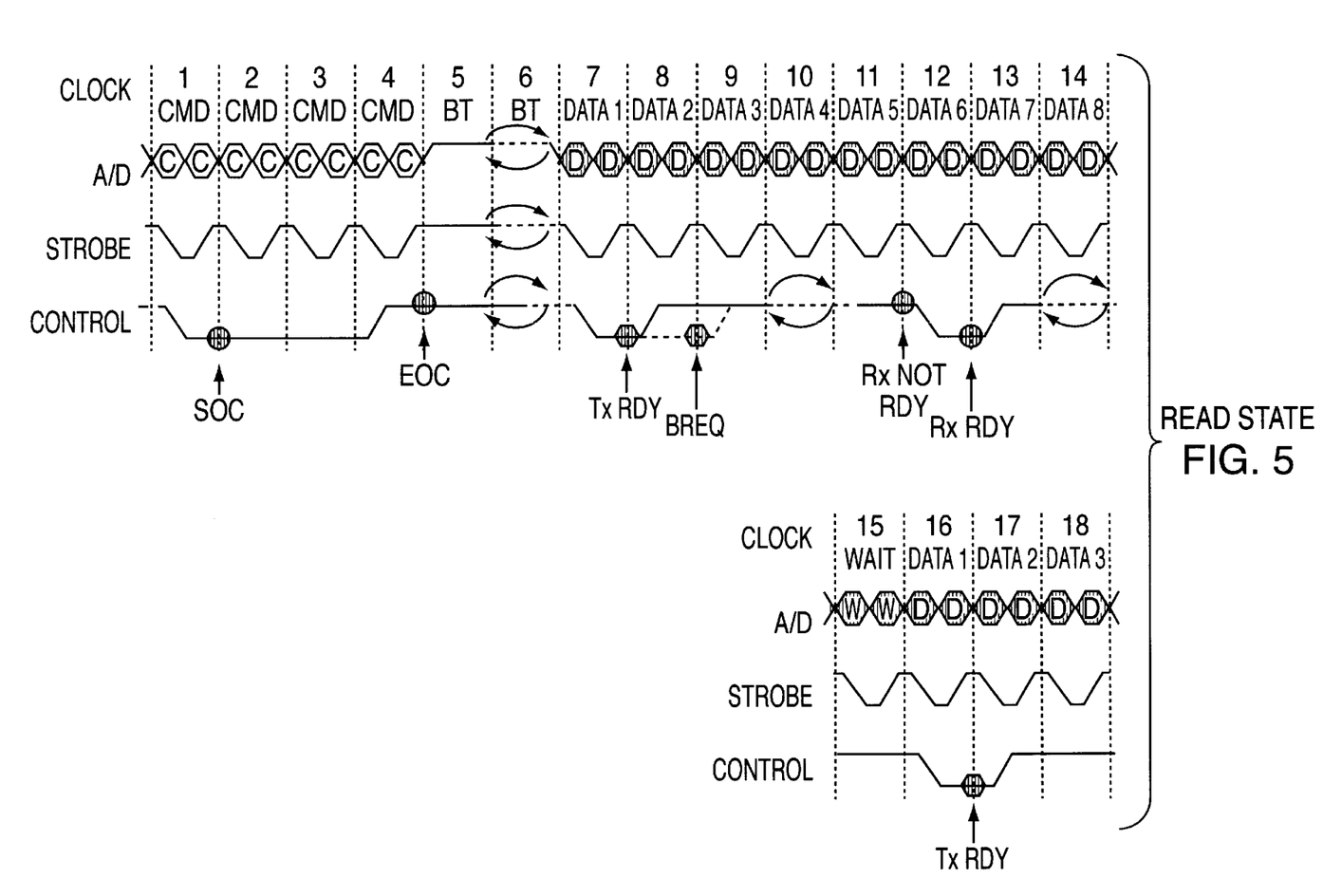
FIG. 5 is a chart illustrating a sequence of signals during a read state on the coprocessor bus of FIG. 1 according to an embodiment of the present invention.

FIG. 5 is a chart illustrating a sequence of signals during a read state on coprocessor bus 100 of FIG. 1 according to an embodiment of the present invention.

The command field of the read state is similar to that of the write state, and signifies that the operation is a read. The figures depict command fields of four clock periods in length and data sections of eight clock periods in length; however, the following description applies to command and data fields of varying lengths. The master device sends the command field on address/data lines 110–113 during the first four clock periods of the read state depicted in FIG. 5. The master device indicates SOC by holding control line 130 low (clock period one) and indicates EOC by holding the control line high (clock period four). Furthermore, the command itself indicates the length of the command field and the granularity of the data sections.

After the command field is sent the master device drives control line 130, strobe line 120, and address/data lines 110–113 high for one clock period (clock period five), after which these lines turn around (so that another device drives the bus) and are driven by the slave device (clock period six).

Three clock periods after the master device sends EOC the slave device starts to send the data section. Flow control signals—RxRDY, Rx not RDY, TXRDY and Tx not RDY— are symmetric to those in the write state. The slave device may send multiple data sections. However, unlike a write state, EOT is not sent by the sending device, as the length of the read transmission is determined by the receiving device, the master device. The master device ends the data transfer with a Receiver End Of Transmission ("RxEOT") signal. Two bits are written on each address/data line 110–113 during each clock period of a read state, and the data sections of the data field have a granularity of eight or 64 clock periods.

During the first clock period of a data section in the read state the slave device indicates TxRDY by holding control line 130 low (clock period seven).

Figure 6:
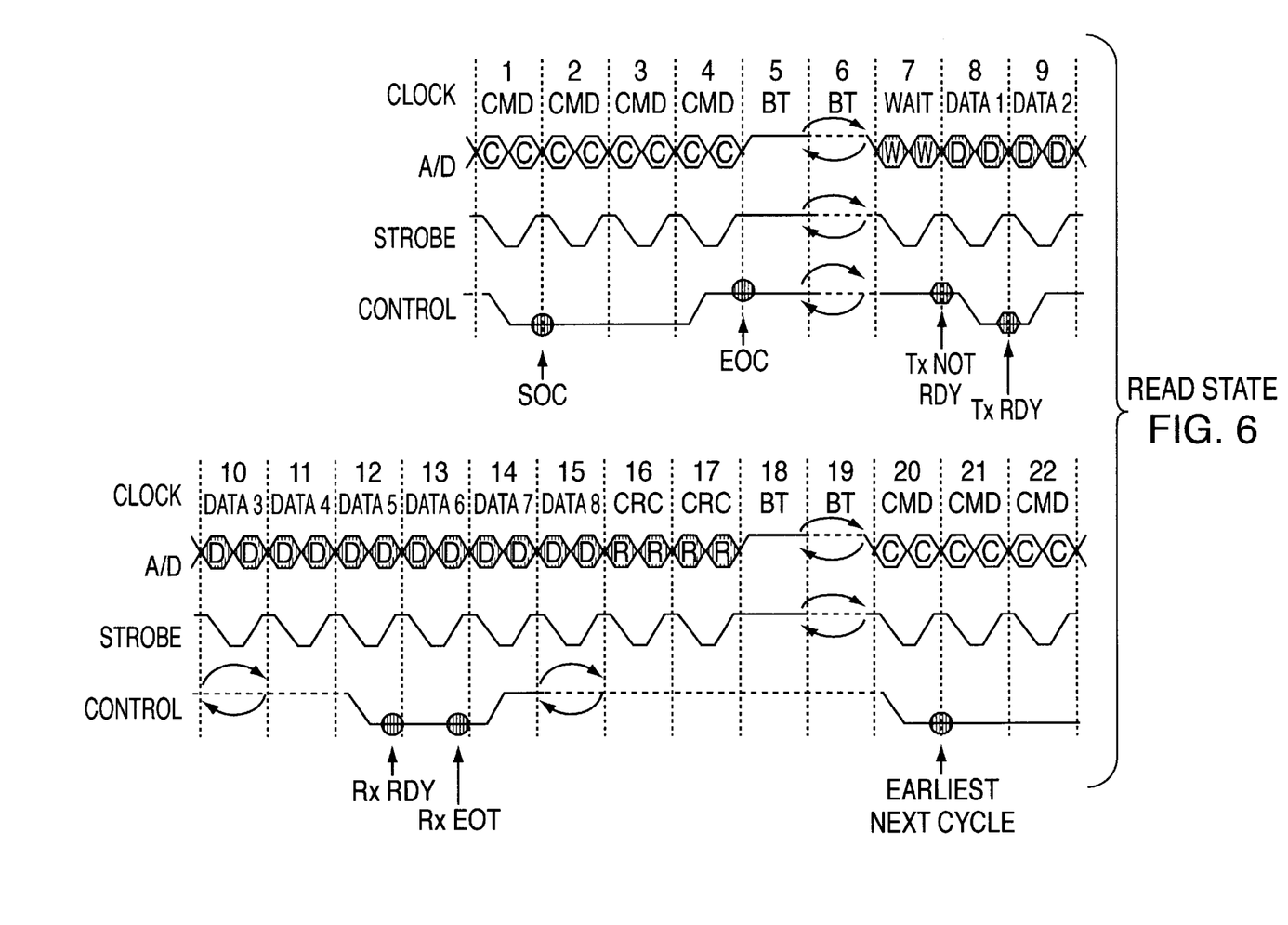
FIG. 6 is a chart illustrating a sequence of signals during a read state on the coprocessor bus of FIG. 1 according to an embodiment of the present invention.

FIG. 6 is a chart illustrating a sequence of signals during a read state on coprocessor bus 100 of FIG. 1 according to an embodiment of the present invention.

If the slave device is not ready to send data it delays sending the data, inserts wait states on address/data lines 110–113 (clock period seven of FIG. 6), and holds control line 130 high (Tx not RDY, clock period seven) until it is ready to send. In response to an indication by the slave device that it is not ready to send, the master device buffers the data received on address/data lines 110–113 but does not accept the data until the slave device sends TxRDY. The master device buffers all input on address/data lines 110–113 but does not start to accept the portion of the buffered data sent on or after the time TXRDY is asserted until it reads a TxRDY signal. In the example shown in FIG. 6, TXRDY is sent in clock period eight. This signal may be recognized after the data which it matches has been buffered.

Referring to FIG. 5, after the slave device indicates TXRDY (clock period seven) it drives control line 130 high for two clock periods (unless a BREQ is issued, as described below), then turns control line 130 around to master device control in data clock period four (FIG. 5, clock period ten).

Referring to FIG. 5, during clock period five of each data section the master device indicates RxRDY by holding control line 130 low for one clock period or indicates it is not ready to receive data (Rx not RDY) by holding control line 130 high until it is ready to receive, at which time it transmits RxRDY by pulling control line 130 low. If the master device indicates it is not ready to receive data the slave device stops sending data after the transmission of the current data section. The master device must receive and buffer the current data section. On an Rx not RDY transmission of the current data section is completed, and the current data section is not resent. As with the write state, wait states are inserted by the slave device if the master device indicates it is not ready to receive (FIG. 5, clock period 15). The slave device continues data (or CRC) transmission no less than four clock periods from the sending by the master device of RxRDY.

One clock period after sending RxRDY the master device may end the read state by asserting Receiver End Of Transmission ("RxEOT"). The RxRDY signal is transmitted by holding control line 130 low for one clock period, and RxEOT is signified by holding control line 130 low for one additional clock period after RxRDY ends. In the example shown in FIG. 6, this occurs in data section clock period six (clock period 13). On the receipt of RxEOT the slave device completes the transmission of the current data section and transmits the CRC section, and the read state terminates. If the master device does not transmit RxEOT, the master device asserts control line 130 high immediately after RxRDY.

The slave device issues a bus control request (BREQ) during a read state by holding control line 130 low for one additional clock period after issuing TXRDY (FIG. 5, clock period eight). TxRDY is issued by holding control line 130 low for one clock period only.

If additional data sections are to be sent after the current data section, control line 130 is turned around to slave device control during the last clock period of the data section (FIG. 5, clock period 14). The sequence of data section flow and control signals repeats with the transmission of the next data section.

A two clock period CRC sequence is inserted after the last data section (FIG. 6, clock periods 16 and 17).

At the termination of the read state, the slave device drives address/data lines 110–113 high for one clock period, and floats (i.e., does not drive) coprocessor bus 100 (FIG. 6, clock periods 18 and 19). When no signals are asserted on coprocessor bus 100 or on any individual lines of bus 100 the lines are pulled high. This two cycle bus turnaround period allows signals sent in one direction on the bus to settle before signals are asserted in the other direction. This is needed because the slave device has control of coprocessor bus 100 at the termination of the read state, and is sending signals in one direction, and bus control must revert to the master device, which sends signals in the opposite direction. After the read state coprocessor bus 100 enters the inactive state with the master device in control of the bus. However, a read state may be followed immediately by another read state or a write state. This is indicated by the master device holding control line 130 low for more than two clock periods, signifying a command section (FIG. 6, clock periods 20–22). The next transfer cannot start less than two clock periods following the termination of the read state. A bus grant occurs during the inactive state, described below, and is signified by the master device holding control line 130 low for exactly two clock periods.

V. Inactive State

In an exemplary embodiment of the present invention the inactive state is a transitional state which takes place between one read, write, or listen state (described below) and another read, write or listen state. After a read or write state the master device may enter coprocessor bus 100 in the inactive state and then start another read or write state, enter the listen state, or grant a BREQ and transfer control of coprocessor bus 100 to the slave device. When a BREQ is granted to a slave device the slave device becomes the master device and the former master device becomes a slave device. After a write state the master device may enter coprocessor bus 100 into another read or write state immediately.

The bus enters the inactive state on reset (FIG. 10). The bus transitions from the inactive state to the read or write state on the initiation of a read or write operation. On the termination of a read or write state the bus returns to the inactive state. The bus transitions from the inactive state to the listen state on the initiation of the master device. When, in the inactive state, the master device either grants a bus request or initiates a transfer, the master device first leaves the listen state and enters the inactive state. From the inactive state a transfer may be initiated or a bus grant may occur.

Figure 7:
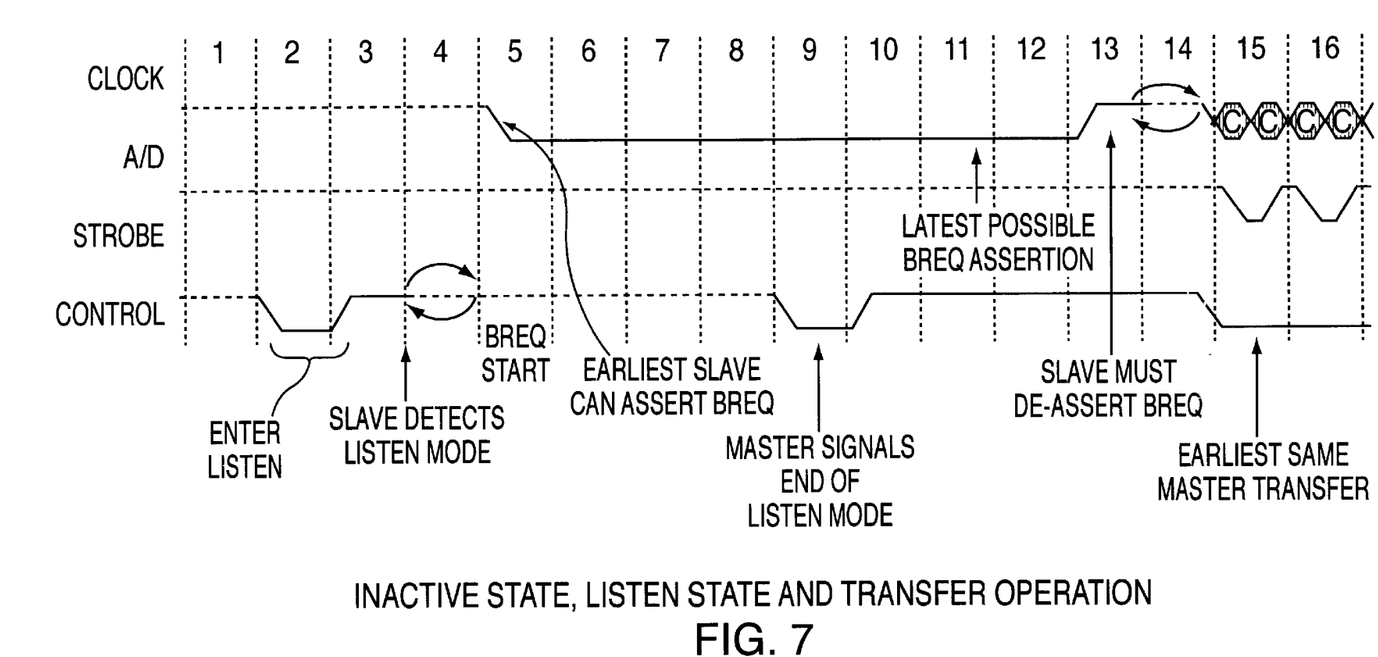
FIG. 7 is a chart illustrating a sequence of signals during the inactive state, the listen state and a transfer operation on the coprocessor bus of FIG. 1 according to an embodiment of the present invention.

FIG. 7 is a chart illustrating a sequence of signals during the inactive state, the listen state and a transfer operation on coprocessor bus 100 of FIG. 1 according to an embodiment of the present invention.

During the inactive state the master device no longer drives strobe line 120, control line 130 and address/data lines 110–113. These lines are pulled high when inactive. The inactive state is shown in clock period 1 of FIG. 7. From the inactive state, the master device may enter the listen state, initiate a read or write state, or grant an outstanding slave device bus request.

During the inactive state the slave device may not issue a BREQ. Therefore, if the master device is not ready to initiate a transfer, it is desirable to enter a read, write or listen state, from which the slave device may transmit a BREQ, soon after entering the inactive state.

In an exemplary embodiment of the present invention, to enter the listen state the master device holds control line 130 low for one clock period and then high for one clock period (FIG. 7, clock periods 2 and 3). During the listen state no data is transmitted, the master device may initiate a read or write state, and the slave device may issue a BREQ.

To initiate a read or write state from the inactive state the master device drives control line 130 low and keeps the control line low for more than two clock periods (e.g., FIG. 6, clock periods 20–22). The command for the read or write state is sent on address/data lines 110–113 starting at the same time that control line 130 is asserted low. In such a case an outstanding bus request, if existing, is ignored.

Figure 8:
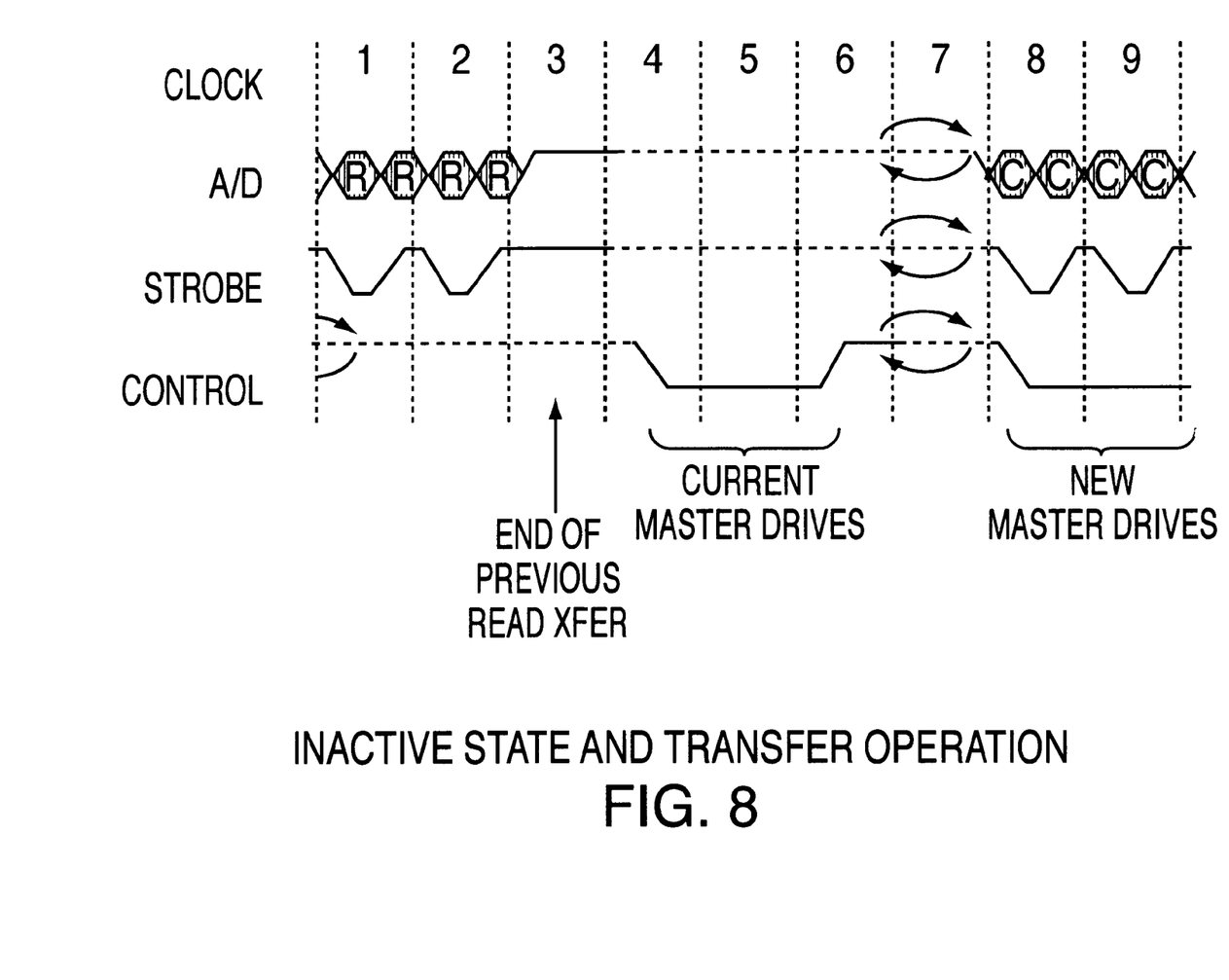
FIG. 8 is a chart illustrating a sequence of signals during the transition from an inactive state to a read or write state with a bus grant on the coprocessor bus of FIG. 1 according to an embodiment of the present invention.

FIG. 8 is a chart illustrating a sequence of signals during the transition from an inactive state to a read or write state with a bus grant on coprocessor bus 100 of FIG. 1 according to an embodiment of the present invention.

To grant a bus request while in the inactive state the master device holds control line 130 low for two clock-periods (FIG. 8, clock periods 4 and 5), holds control line 130 high for one clock period (clock period 6), and then floats coprocessor bus 100 (clock period 7) during a turnaround period which lasts a minimum of one clock period. One clock period after the former master floats the bus the slave device may assume master device status and may start driving control line 130. At the end of a read or write state the master device must wait one clock period before issuing a bus grant; this is shown in clock period 3 of FIG. 8.

VI. Listen State

In an exemplary embodiment of the present invention, when neither the master device nor the slave device needs to perform a read or write operation, the master device may place coprocessor bus 100 in a listen state. In the listen state no data transfer takes place but the master device may initiate a data transfer and the slave device may issue a BREQ. After a read or write state coprocessor bus 100 enters the inactive state. The slave device may not issue bus requests in the inactive state because the master device and slave device are not synchronized and no protocol exists to ensure arbitration signals do not collide or interfere with each other. The listen state solves this problem by defining a protocol allowing the master device to initiate a data transfer and the slave device to request bus ownership at a time when no data is being sent, when the devices may not be synchronized, and when the devices and the bus may be in a low power state.

After the end of a read or write state coprocessor bus 100 may be in the inactive state (FIG. 10). At this point the master device may grant a bus request, initiate a new read or write transaction (thus ignoring an outstanding bus request), or place coprocessor bus 100 in the listen state. While in the listen state the master device may initiate a transaction using control line 130, and the slave device may issue a BREQ using address/data line[0] 110.

In an exemplary embodiment of the present invention the listen state is entered from the inactive state (FIG. 10). To enter the listen state, the master device drives control line 130 low for one clock period, then high for one clock period (FIG. 7, clock periods 2 and 3). Two clock periods must elapse after a read or write state before the master device may cause the entry in to the listen state. Address/data lines[1–3] 111–113 and strobe line 120 float in the listen state; address/data line[0] 110 floats until the slave device asserts a BREQ. The master device and the slave device are not synchronized during the listen state. No synchronization is needed, as each device signals on a different line.

For the slave device to request ownership of coprocessor bus 100 (and thus master status) during the listen state by issuing a BREQ, it drives address/data[0] line low and holds this line low until the end of the listen state (FIG. 7, clock periods 5 through 12). Address/data[0] must be held low for at least two clock periods, as the address/data lines are not synchronized to the clock. The slave device may issue the BREQ as early as one clock period after the master device raises control line 130 high on the entry to the listen mode.

Figure 9:
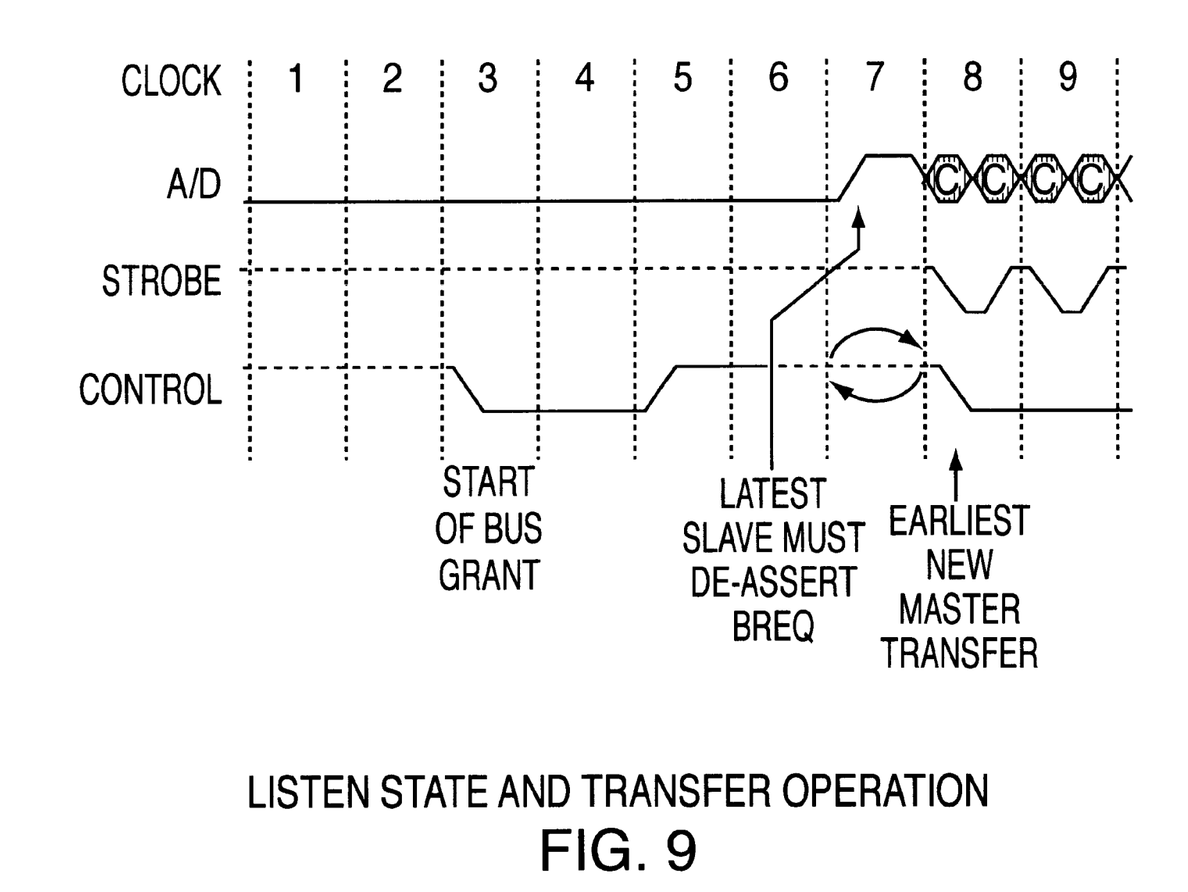
FIG. 9 is a chart illustrating a sequence of signals during the transition from a listen state to a read or write state with a bus grant on the coprocessor bus of FIG. 1 according to an embodiment of the present invention.

FIG. 9 is a chart illustrating a sequence of signals during the transition from a listen state to a read or write state with a bus grant on coprocessor bus 100 of FIG. 1 according to an embodiment of the present invention.

The master device must take coprocessor bus 100 out of the listen state and into the inactive state before granting a BREQ or initiating a read or write operation (FIG. 10). However the exit from the listen state and the transfer initiation or grant may happen essentially simultaneously. To leave the listen state and grant a bus request the master device holds control line 130 low for two clock periods (FIG. 9, clock periods 3 and 4), holds control line 130 high for one clock period (clock period 5), and then floats coprocessor bus 100. This indicates the end of the listen state and a change in bus ownership. The slave device must de-assert the BREQ within two clock periods of the grant of bus ownership (clock period 7).

The master device may exit the listen state to initiate a transfer and ignore any outstanding BREQ; this is illustrated in FIG. 7. To exit the listen state without a bus grant the master device holds control line 130 low for one clock period (clock period 9) and then raises control line 130 high (clock period 10). This indicates the end of the listen state and the initiation of a read or write by the master device. The master device may not initiate a read or write for four clock periods after raising control line 130 high to indicate the end of the listen state. Thus control line 130 remains high for at least four clock periods before the master device pulls control line 130 low to indicate the start of a command. This delay ensures the slave device recognizes the master device signal indicating the end of the listen state. The slave device assumes the master device remembers outstanding bus requests; however, the master device may ignore these requests indefinitely.

The slave device may issue a BREQ after the master device indicates the listen state is being exited for a transfer but before the listen state ends. The BREQ may be honored after the read or write state following the listen state. A BREQ issued at this point must be asserted the clock period after the master device raises control line 130 high to indicate the end of the listen state. In FIG. 7, such a BREQ must be asserted by clock period 11. Any BREQ during the listen state, no matter when issued, must be de-asserted three clock periods after the master device indicates the listen state is being exited. In FIG. 7, such a BREQ must be de-asserted by clock period 13.

VII. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

For example, alternate embodiments may utilize the system and method of the present invention for signals other than flow control or arbitration signals. The system and method of the present invention may be used with busses servicing more than two devices, and encompasses systems and methods using device status definitions other than "master" status and "slave" status. The bus used in other embodiments of the present invention may have numbers of lines and types of lines other than those specified herein. Different methods may be used to send clock and synchronization information.

The specific methods of identifying commands, using bus states and timing, need not be used. Other embodiments may use different bus states or may eliminate bus states altogether. Other timing, state, and length criteria may be used to define the signals described herein or other signals. For instance, the signals described may occur in other clock periods and have lengths other than those described herein.

Other embodiments may define signals having meanings other than those defined herein. Other embodiments may use other lengths and formats for command and data fields and other methods to transmit command and address information. The specific data packet protocol described, having a defined command section and a defined data section, need not be used. Other error detection and data buffering methods may be used.

What is claimed is:

1. A bus allowing a set of devices to communicate, the set of devices comprising a first device and a second device, the bus comprising:
   an at least one data line;
   a strobe line; and
   a control line;
   wherein the control line is driven by the first device during a first phase of a data transfer operation and the control line is driven by the second device during a second phase of the data transfer operation.

2. The bus of claim 1 where:
   the control line allows control information to be transmitted while data information is being sent on the at least one data line.

3. The bus of claim 2 where an information content of the control information is based on the timing of the control information.

4. The bus of claim 3 where the control information includes a ready message, the ready message being transmitted by asserting a signal on the control line during a predetermined phase of the data transfer operation.

5. The bus of claim 2 where an information content of the control information is based on the state of the bus.

6. The bus of claim 2 where the control information has a start time, an end time, and an information content, and where the information content of the control information is based on the start time of the control information and the end time of the control information.

7. The bus of claim 1 where:

control information is sent on the control line; and an information content of the control information is based on the timing of the control information.

8. The bus of claim 1 where the first device is a master device and the second device is a slave device and the signals on the control line allow the slave device to become the master device and the master device to become a slave device.

9. The bus of claim 1 where:

the first device has master device status;

the second device has slave device status;

a device in the set of devices may request master device status;

a device in the set of devices having master device status may obtain slave device status; and a device having slave device status requests master device status by asserting a signal on the control line during a predetermined phase of a data transfer.

10. A method for allowing a set of devices to communicate using a bus, the set of devices comprising a first device and a second device, comprising:

transmitting data;

while the data is being transmitted, transmitting a set of control signals on a control line; and while the data is being transmitted:

driving the control line by the first device during a first time; and driving the control line by the second device during a second time.

11. The method of claim 10 where each control signal consists of a binary signal having a start time and a length, where the significance of the control signal is related to the start time of the control signal and the length of the control signal.

* * * * *